Nov. 18, 1941.  H. O. FLYNN  2,263,079
BRAKE DRUM SEAL
Filed April 1, 1941
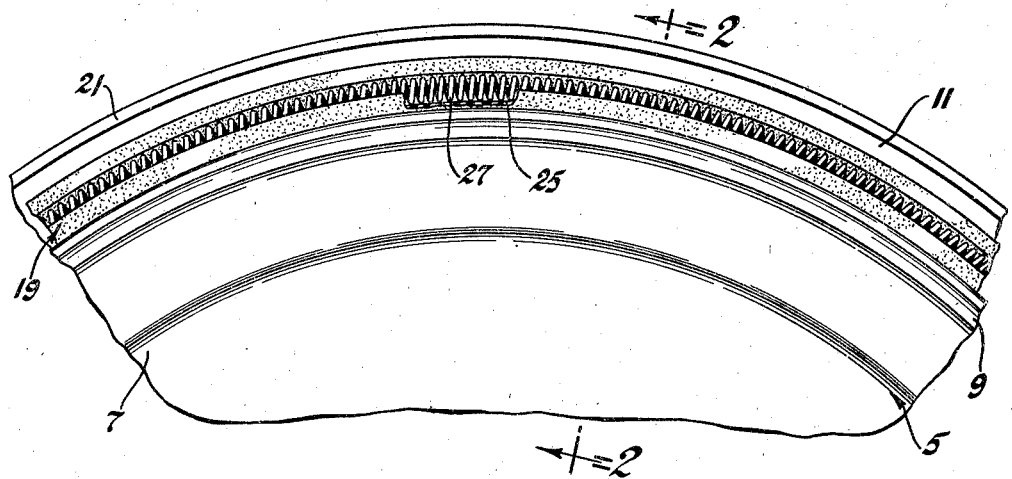
Fig. 1
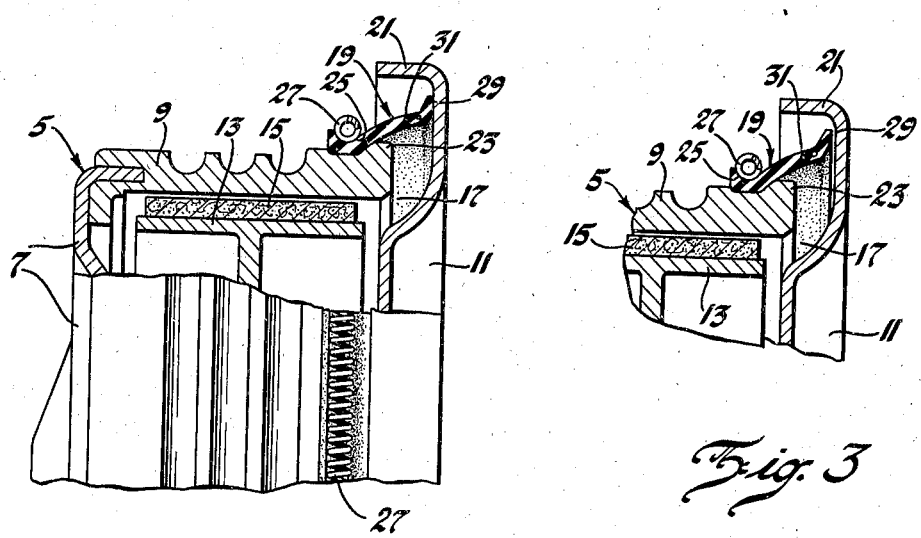
Fig. 2
Fig. 3
Inventor
Harold O. Flynn
By Blackmore, Spencer & Flint
Attorneys Patented Nov. 18, 1941

2,263,079

UNITED STATES PATENT OFFICE 2,263,079

BRAKE DRUM SEAL

Harold O. Flynn, Detroit, Mich., assignor to General Motors Corporation, Detroit, Mich., a corporation of Delaware Application April 1, 1941, Serial No. 386,336

7 Claims. (Cl. 188—218)

This invention relates to brakes for vehicles and more particularly to sealing means for closing the gap necessarily present between the rotating wheel carried drum and the non-rotating drum cover or backing plate.

An object of the invention is to effectively close the gap to prevent the entry of water and foreign matter to the drum enclosure, but to prevent wear producing friction between the sealing means and the relatively moving part for all considerable speeds.

The invention is illustrated in the accompanying drawing in which:

Figure 1 is a view in elevation as seen from the left of Fig. 2.

Fig. 2 is a section on line 2—2 of Fig. 1.

Fig. 3 is a view similar to Fig. 2, but showing the position of the seal when the vehicle is in motion.

Referring by reference characters to the drawing, numeral 5 designates a more or less conventional brake drum which is to be carried by a rotating vehicle wheel. It includes in the embodiment shown a steel back 7 and a cast iron ring 9. Closing the opening of the drum is a cover or backing plate 11. This plate is to be carried as usual by the non-rotating axle in the case of a rear wheel. For a front wheel the cover is carried by the steering knuckle. Within the drum is shown a part of a shoe marked 13 with lining 15. The invention is not concerned with the specific shoe assembly nor with the spreading means by which contact with the rotating drum is made.

As shown, there is a gap between the cover and the drum. This gap marked 17 is closed when the vehicle is at rest by a seal 19. In the embodiment shown, the cover is of greater diameter than the drum and is turned back over the end of the drum as at 21. The seal 19 is made of flexible material such as rubber or the like, asbestos-neoprene or some similar heat and oil resistant substance being contemplated. The seal is shaped as shown, is fitted over a ledge 23 at the open edge of the drum and is recessed as at 25 to receive a seal retaining coil spring 27. From the point of attachment the seal extends outwardly and upwardly and normally its somewhat thinner end contacts the cover plate at 29. Preferably this outer end is reinforced by particles of lead 31 or other substance to give it weight and to render it more responsive to centrifugal force.

When the vehicle is standing or slowly moving the seal contacts the cover plate. It thus prevents foreign matter from entering the drum enclosure. If the contact were maintained when the vehicle is in motion, particularly at any considerable speeds, the frictional contact would more or less rapidly wear out the flexible seal. Mounted as it is, however, and especially because of the weights 31, the outer edge of the seal breaks contact with the cover plate at some low speed of vehicle travel, as at eight or ten miles per hour, and wear of the seal is thus avoided.

I claim:

1. In a brake assembly including a drum and cover plate, a seal carried by the drum and normally in contact with the cover but constructed and arranged to break said contact under the influence of centrifugal force induced by drum rotation.

2. The invention defined by claim 1, said seal being an annulus of flexible oil and heat resistant material, means to secure one end to the drum, its axial extent being sufficient to close the gap between the drum and cover plate and its free end adapted to contact the cover.

3. The invention defined by claim 1, said seal being weighted adjacent its region of contact with the cover.

4. A brake drum, a cover therefor of greater radius than the drum, an annular flexible seal having one end secured to the edge of the drum, extending axially over the gap between the drum and cover and having its other end normally in contact with the cover but adapted to break contact therewith under the influence of centrifugal force.

5. A brake drum, a cover therefor of greater radius than the drum, an annular flexible seal having one end secured to the edge of the drum, extending both axially and radially over the gap between the drum and cover and having its other end normally in contact with the cover but adapted to break contact therewith under the influence of centrifugal force.

6. The invention defined by claim 5, said other end being weighted.

7. The invention defined by claim 4, said drum securing means including a ledge at the edge of the drum engaged by said seal and a retaining coil spring surrounding the seal.

HAROLD O. FLYNN.